United States Patent [19]

Vinchant et al.

[11] Patent Number: 5,442,723
[45] Date of Patent: Aug. 15, 1995

[54] SEMICONDUCTOR STRIP ACTIVE OPTICAL DEVICE

[75] Inventors: Jean-Francois Vinchant, Bruyeres le Chatel; Monique Renaud, Saint Cheron; Marko Erman, Paris, all of France

[73] Assignee: Alcatel N.V., Amsterdam, Netherlands

[21] Appl. No.: 297,057

[22] Filed: Aug. 29, 1994

[30] Foreign Application Priority Data

Sep. 2, 1993 [FR] France .................... 93 10468

[51] Int. Cl.⁶ .................................... G02B 6/10
[52] U.S. Cl. .................................... 385/129
[58] Field of Search ................. 385/129-132

[56] References Cited

FOREIGN PATENT DOCUMENTS 3073905  3/1991  Japan .
4240809  8/1992  Japan .

Primary Examiner—Akm E. Ullah
Attorney, Agent, or Firm—Sughrue, Mion, Zinn, Macpeak & Seas

[57] ABSTRACT

A guide structure of a strip semiconductor active optical device includes a core structure extending as far as coupling surfaces. It includes at least three high index layers having refractive indices increased relative to that of the surrounding media to increase in these layers the power density of light to be processed, for example amplitude modulated, by the device. The high index layers have compositions such that they can apply this processing in response to electrical excitation and thicknesses greater than those of quantum wells. They are separated by lower refractive index dilutant layers with greater thicknesses such that a single propagation mode of light is guided by the guide structure. This mode has a thickness suited to coupling to an external optical component whilst confining the majority of the power of the light within the thickness of the core structure to favor the processing.

8 Claims, 3 Drawing Sheets

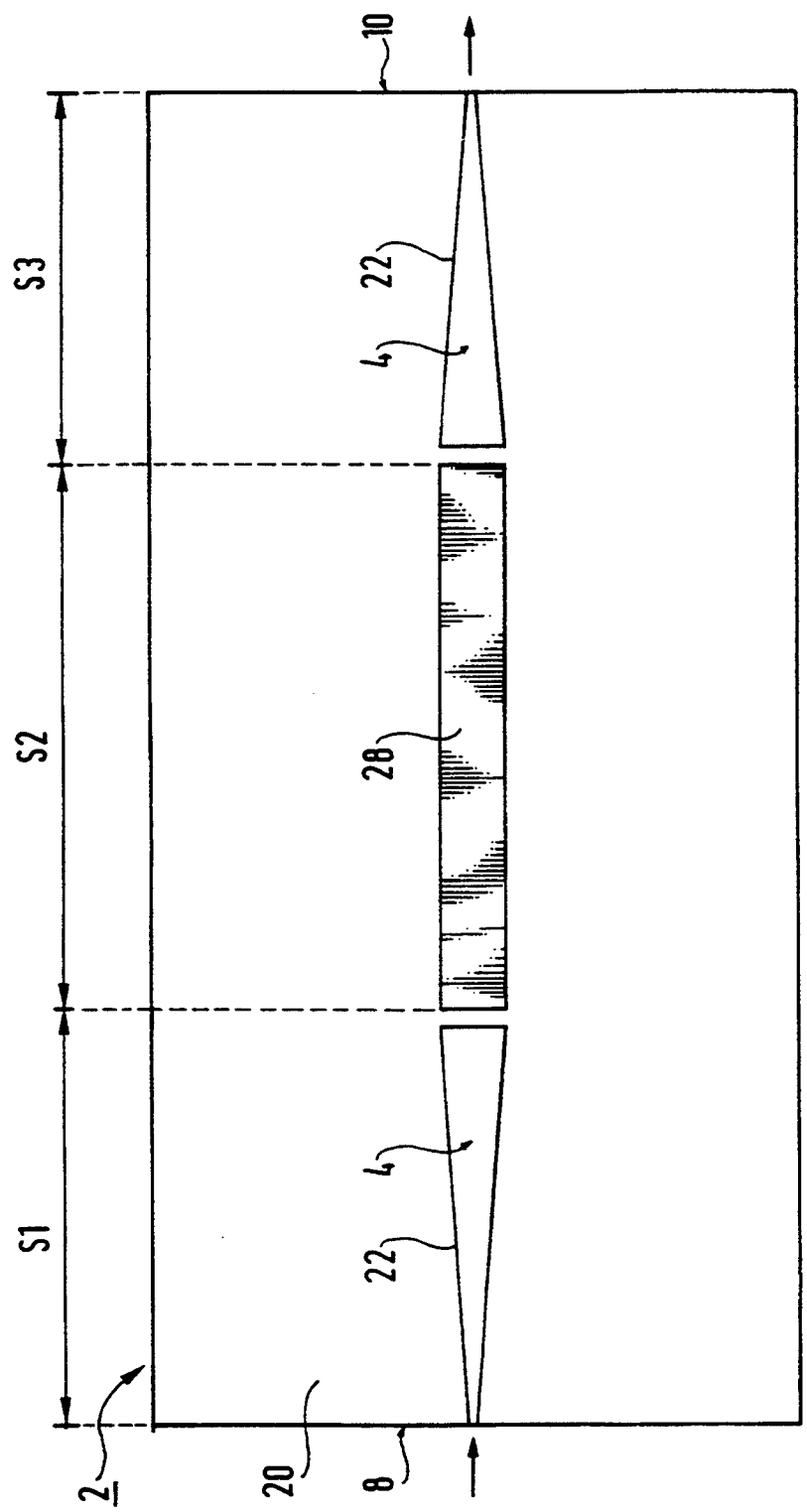

SEMICONDUCTOR STRIP ACTIVE OPTICAL DEVICE

BACKGROUND OF THE INVENTION

1. Field of the Invention

The present invention concerns an active optical waveguide semiconductor device. A device of this kind includes a waveguide for light to be processed by the device. This waveguide is active in the sense that it is adapted to modify in a controlled manner at least one parameter characteristic of the light, using an electrical signal. The device is a semiconductor device to enable the control signal to operate by modifying a charge carrier density in the waveguide.

2. Description of the Prior Art

A device of this kind is typically an amplitude modulator, a laser emitter or amplifier, or a phase modulator, for example. It must be coupled to at least one external optical component and typically to two such components each comprising an optical fiber.

A device of this kind includes a semiconductor wafer. The wafer defines mutually perpendicular longitudinal, transverse and vertical directions. Lengths, widths and thicknesses are defined in these respective directions. The wafer has horizontal top and bottom surfaces. It extends in the longitudinal direction between two end surfaces. At least one of these end surfaces constitutes a coupling surface which an external optical component such as an optical fiber faces to achieve coupling between this external component and the device for light to be processed by the device. The wafer includes horizontal layers with a continuous crystal structure comprising layers of given thickness in succession in the vertical direction. These layers constitute structures each including one layer or a plurality of adjacent layers. The compositions, thicknesses and order of succession of the layers in a structure of this kind constitute a sequence of layers of this structure. These layers and structures are as follows, starting from the bottom surface:

- A base structure having a first type of conductivity. At least an upper part of this structure constitutes a bottom confinement layer.
- A core structure including a high index layer having a higher refractive index increased relative to that of the surrounding materials. This high index layer has a thickness greater than that of a quantum well and a composition such that its energy gap causes it to interact with the light to be processed by the device, this interaction being conditioned by a charge carrier density in this layer, which is therefore an active layer with respect to this light.
- A top confinement layer which is transparent to the light to be processed by the device. This layer is formed on the core structure and with the bottom confinement layer and the core structure constitutes a guide structure. One layer of the latter is delimited in the transverse direction over at least part of its thickness to form a longitudinal strip. The light to be processed is guided along the longitudinal direction by the guide structure in a single guided mode having a given thickness. The value of said charge carrier density in the width of the strip controls interaction of the high index layer with the light of the guided mode so that this value constitutes a control density.

Finally, a control layer is formed on the top confinement layer. This control layer has a second type of conductivity opposite to the first and an increased dopant concentration giving it an increased electrical conductivity to enable the control density to be varied by an electrical control signal applied between the base structure and this control layer. This increased dopant concentration causes the control layer to absorb the light to be processed.

The top confinement layer is of limited thickness so that the control signal can vary the control density. Its thickness is sufficiently great relative to that of the guided mode to limit absorption of the light in the control layer.

When included in an optical transmission or switching system, a device of this kind, such as a modulator, introduces insertion losses which are often high and which researchers have been seeking to reduce for many years. These insertion losses include Fresnel losses, internal losses and coupling losses. The Fresnel losses are caused by reflection at the entry and exit coupling surfaces of the device. They are easily and conventionally eliminated by depositing an antireflection layer on the surfaces. The internal losses result from absorption of light within the device. They are moderate because the sequence of layers of the guide structure renders a confinement ratio of this structure sufficiently high, for example greater than 70%. This confinement ratio is the ratio of the power of the guided mode within the thickness of the core structure to the total power of this mode. These losses would become high if the light had to propagate in the control layer, however. The coupling losses typically result from a mismatch between the internal light mode guided in the device and a wider external light mode guided in an external component in the form of an optical fiber. These coupling losses are conventionally reduced by using fibers fitted with lenses. Even so, the coupling losses at the end of conventional thin active structures remain high (typically 5 dB at each surface). This is why arrangements of greater or lesser complexity have been adopted to reduce these coupling losses, among other things.

An arrangement of this kind is used in a first prior art device. A monomode guide structure of this device includes a single high index layer. The structure is active given that the high index layer is active. This layer can comprise a succession of thin layers each constituting a quantum well. This active guide structure guides a mode whose thickness is chosen to achieve highly efficient interaction with limited internal losses due to absorption in the control layer. The resulting choice of thickness is too small to enable good coupling to an external optical fiber. It is typically between 0.4 $\mu$m and 0.6 $\mu$m. A mode of this thickness can be classified as "thin".

This can be illustrated by two typical structures that are feasible for a prior art device of this type. The high index layers of these structures are GaInAsP quaternary layers between InP layers, the confinement ratio exceeding 70%. A relatively high index quaternary layer structure corresponds to a mode thickness around 0.4 $\mu$m and a relatively low index quaternary layer structure to a mode thickness of 0.6 $\mu$m.

These two structures and other structures in accordance with the present invention using the same materials are described hereinafter by way of their sequences of layers. Each layer will be defined between two parentheses, firstly by its refractive index n and then if necessary by its thickness e, an indication of the composition of the quaternary materials being also given by the cut-off wavelength λg of the material, i.e. the wavelength corresponding to the forbidden band of the material.

The two structures mentioned above are as follows: (n=3.17) (n=3.45 e=400 nm, λg=1 420 nm) (n=3.17) and (n=3.17) (n=3.29 e=600 nm, λg=1 110 nm) (n=3.17).

To limit coupling losses in a device of the same kind as this first prior art device, its active guide structure is followed, lengthwise of the device, by a monomode passive guide structure guiding a mode with a greater thickness. This passive structure comprises a single core layer. The thickness of the mode that it guides is chosen to limit losses where it is coupled to an external optical fiber or to some other external optical component analogous to a fiber in so far as its coupling characteristics are concerned. This thickness is typically between 1 μm and 4 μm. The mode having this thickness can be called "thick".

To prevent coupling losses between the two guide structures guiding the thin and thick modes, the transition between then is made highly progressive and is referred to as "adiabatic transition" or "taper". This first prior art device is described in "Efficient fiberchip butt coupling using InGaAsp/InP waveguide tapers" L. Moeil, L. Ahlers, P. Albrecht, H. Engel, H. J. Hensel, H. P. Nolting and F. Reier, (OFC/I000C'93 Technical digest, ThK2, p. 212–213 published by Optical Society of America).

A second prior art device is described in "New structure for efficiently coupling a waveguide to an optical fiber".—J. Haes, J. Willems, R. Baets, J. Buus and W. J. Stewart, (OFC/I000C'93 Technical Digest, WH8, p. 118–119 published by Optical Society of America).

An active guide structure of this second prior art device includes an active high index layer and guides a single "thin" mode. This is why, in order to limit coupling losses, it is replaced near each coupling face, without any transition area, by a composite passive structure made up of three stacked high index layers separated by dilutant layers of lower refractive index. Three modes can be guided by the respective three high index layers, with different phase velocities. All three are excited by the single thin mode, with respective initial phases. Given appropriate choices of the pertinent optical parameter values, i.e. the refractive indices and thicknesses of the layers, the three guided modes arrive at the coupling face with relative phases such that their combination is locally equivalent to a "thick" mode, enabling coupling to an optical fiber with low losses.

The arrangements adopted in the first and second prior art devices are effective in that the thin mode limits internal losses in the device and the thick mode limits coupling losses. They have the disadvantage of being costly to fabricate, however.

SUMMARY OF THE INVENTION

One object of the present invention is a simple and low-cost way to limit all insertion losses in a semiconductor device of the kind previously described.

To this end the present invention comprises a strip semiconductor active optical device wherein the guide structure includes a core structure extending as far as a coupling surface of the device and includes at least three high index layers having refractive indices increased relative to that of the surrounding media in order to increase in said layers the power density of light to be processed in the device, said high index layers having compositions enabling them to perform said processing in response to electrical excitation, and having thicknesses greater than that of quantum wells, said high index layers being separated by dilutant layers having a lower refractive index and greater thicknesses so that a single mode of propagation of said light is guided by said guide structure and has a thickness suited to coupling to an external optical component from said coupling surface with the majority of the power of said light confined within the thickness of said core structure to favor said processing.

How the present invention may be put into effect will now be described in more detail, by way of non-limiting example and with reference to the appended diagrammatic drawings. If the same device is shown in more than one figure, it is always identified by the same reference symbol.

BRIEF DESCRIPTION OF THE DRAWINGS

FIG. 2 shows a top view of the device from FIG. 1.

DETAILED DESCRIPTION OF THE PREFERRED EMBODIMENT

Figure 1:
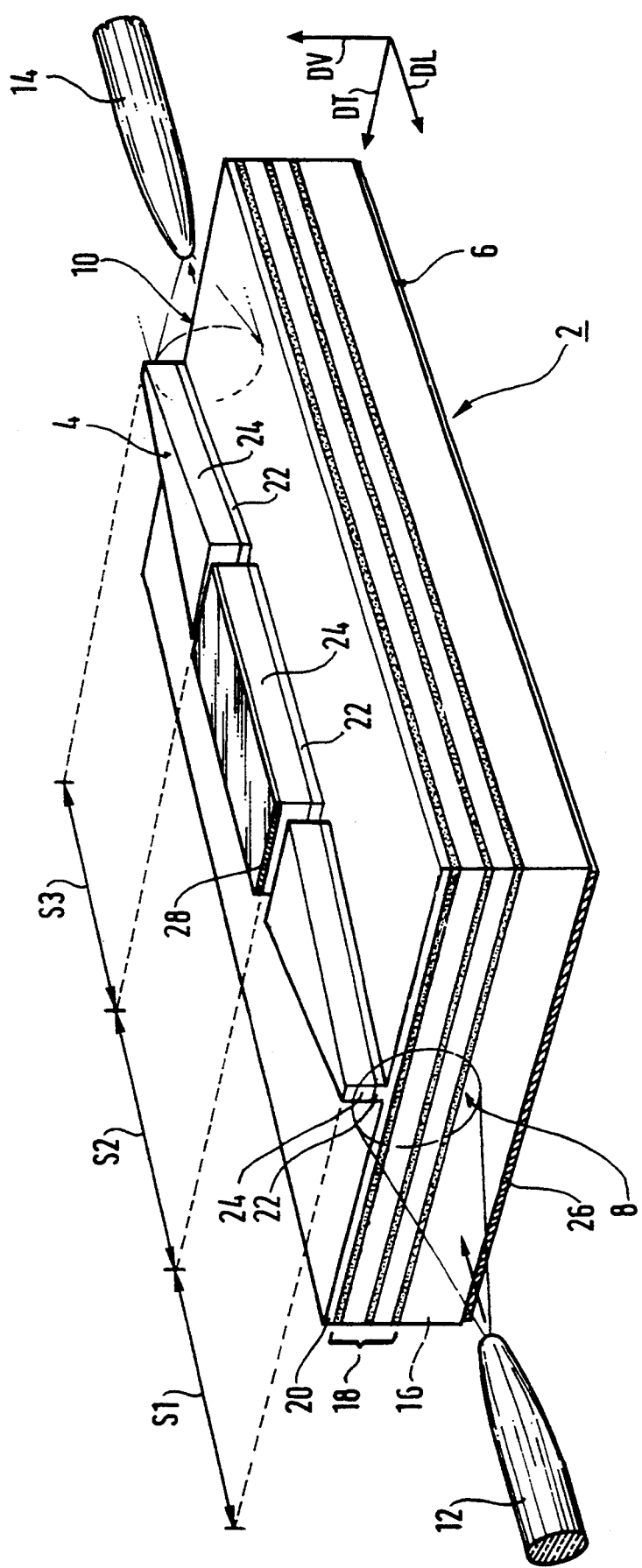
FIG. 1 shows a perspective view of a device of this invention.
Figure 4:
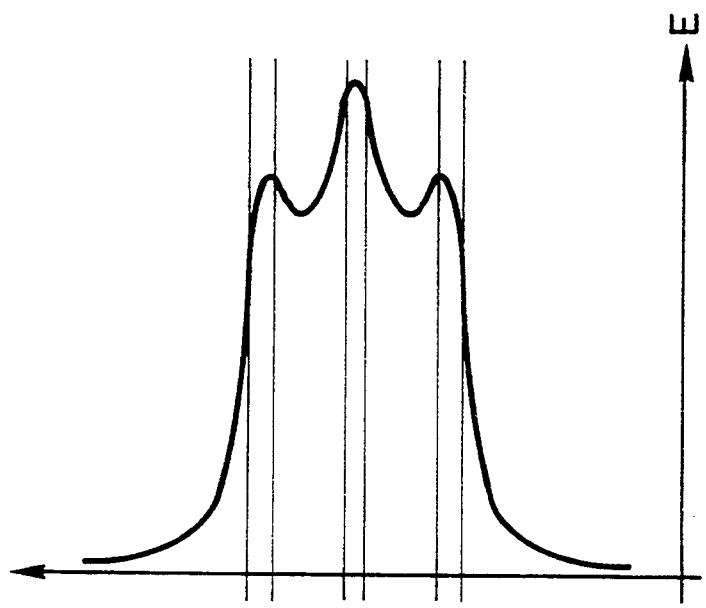
FIG. 4 shows a diagram of the luminous intensity of the mode guided by the device as a function of depth within the device, the intensity being plotted on the abscissa axis and the depth on the ordinate axis, in corresponding relationship to FIG. 3.

Referring to FIG. 1, the device in this example includes a semiconductor wafer 2 defining mutually perpendicular longitudinal, transverse and vertical directions DL, DT and DV, respectively, and horizontal planes perpendicular to the vertical direction. Lengths, widths and thicknesses are defined in these longitudinal, transverse and vertical directions, respectively. The wafer has a top surface 4 and a bottom surface 6 which are horizontal. It extends longitudinally between two end surfaces constituting two coupling surfaces. An external optical component in the form of a lensed optical fiber 12 or 14 faces each coupling surface to couple light to be processed by the device between the latter and this external component. The wafer 2 is made up of horizontal layers having a continuous crystal structure and successive thicknesses in the vertical direction and constituting structures each including one layer or a plurality of adjacent layers. The compositions, thicknesses and order of succession of the layers of a structure of this kind constitute a sequence of layers of the structure. These layers and structures are as follows, starting from the bottom surface 6:

- A base structure 16 having a first type of conductivity, for example n type conductivity. At least an upper part of this structure, and for example all of the structure, constitutes a bottom confinement layer. This layer is transparent, that is to say transparent to the light to be processed by the device.
- A transparent core structure 18 including high index layers each having a refractive index increased relative to those of the surrounding materials and a thickness greater than that of a quantum well. The composition of these layers gives them an energy gap which causes them to interact with the light to be processed by the device, this interaction being conditioned by a charge carrier density in these layers, which are therefore active layers.

A transparent top confinement layer 20, 22 formed on the core structure. This layer constitutes with the bottom confinement layer and the core structure a guide structure 16, 18, 20, 22. At least one layer of this guide structure is delimited in the transverse direction over at least part of its thickness to form a strip 22 having a given width and extending in the longitudinal direction so that the light to be processed by the device is guided monomodally by the guide structure in this longitudinal direction in a single guided mode having a width related to that of the strip. This mode also has a given thickness. The value of said charge carrier density within the width of this strip controls interaction of the high index layers with the light of this guided mode so that this value constitutes a control density.

Finally, a control layer 24 is formed on the top confinement layer 20, 22 in an active segment S2 occupying part of the length of the wafer 2. This control layer has the second type of conductivity, for example p type conductivity. It has an increased dopant concentration which increases its electrical conductivity so that it can vary said control density by means of an electrical control signal applied between the base structure 16 and the control layer 24. This increased dopant concentration causes the control layer to absorb the light to be processed by the device.

The top confinement layer 20, 22 has a limited thickness so that the control signal can effectively modify the control density. Its thickness is great enough relative to that of the guided mode to limit absorption of the light from this mode into the control layer.

Bottom and top electrodes 26, 28 are formed on the bottom and top surfaces 6 and 4, respectively, in the active segment S2 in order to apply the control signal between the base structure and the control layer.

Figure 3:
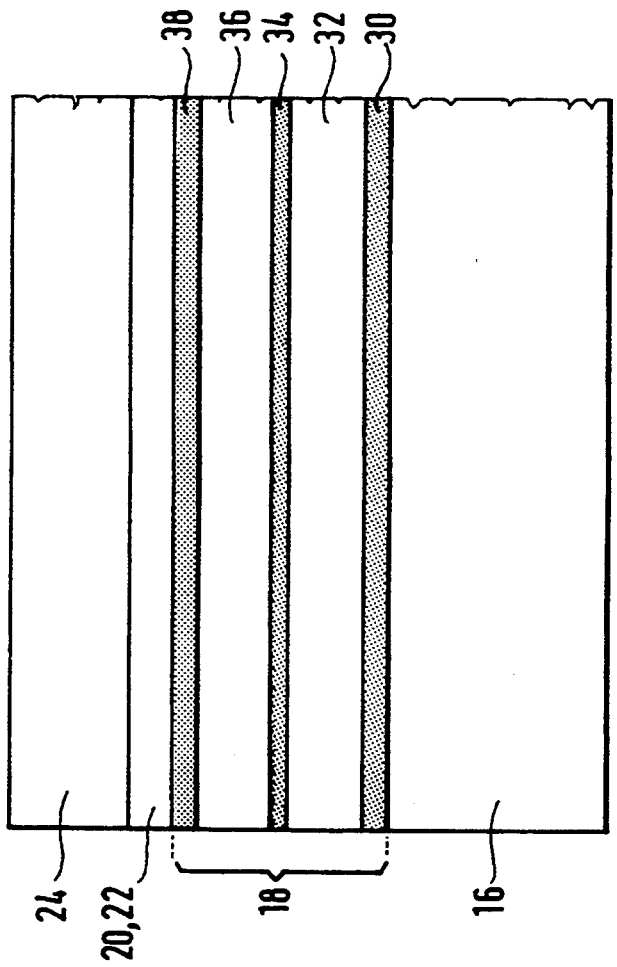
FIG. 3 shows a view of this device partly in cross-section to show the depths and thicknesses of its layers.

Referring to FIG. 3, the core structure 18 includes at least the following layers starting from the bottom confinement layer 16 and ending at the top confinement layer 20, 22:
- a bottom high index layer 30,
- a bottom dilutant layer 32 having a lower refractive index than this high index layer,
- a median high index layer 34,
- a top dilutant layer 36 having a lower refractive index than these high index layers, and
- a top high index layer 38.

The sequence of layers of the guide structure 16, 18, 20, 22 is such that the single guided mode constitutes a thick mode having a thickness suitable for coupling to an external optical component. The guide structure extends longitudinally without any change in its sequence of layers in the active layer S2 and as far as each coupling surface 8, 10.

The sequence of layers of this structure confers a confinement ratio exceeding 70% and a guided mode thickness between 1 $\mu$m and 2 $\mu$m.

The high index layers 30, 34, 38 and the dilutant layers 32, 36 and confinement layers 16, 20, 22 have a refractive index difference exceeding 0.15 and individual thicknesses exceeding 30 nm in order to concentrate the light in these layers to favor said interaction. The individual thicknesses of these high index layers are less than 300 nm so that there is only one guided mode.

A dilution ratio can be defined as the ratio of the total thickness of the core structure 18 to the total thickness of the high index layers alone. The dilution ratio is greater than 2 to make the guided mode a desirable thickness, as previously indicated.

A global structure including all the semiconductor layers 16 through 24 of the wafer 2 preferably has a constant sequence of layers in the active segment S2 and as far as each coupling surface 8, 10.

The wafer 2 also has along its length first and second coupling segments S1 and S3 extending between the active segment S2 and the respective coupling surface 8 or 10. The top electrode 28 is formed only in the active segment S2.

As shown, the width of the strip 22 can decrease progressively in each coupling segment S1 or S3 from the active segment S2 to the coupling surface 8 or 10. This enables the thickness of the guided mode at this surface to be increased, possibly enabling use of cleaved fibers rather than the lensed fibers 12 and 14.

Referring to FIG. 1, the layer delimited in the transverse direction is the top confinement layer 20, 22 or rather the upper part of the thickness of this layer constituting the strip 22. The control layer 24 and the top electrode 28 are present only in the area of the strip 22 to constitute a guide structure of the prior art etched strip type.

The layer delimited in the transverse direction could instead be the median high index layer, for example, to constitute a different type of prior art structure, namely the buried strip structure.

Two guide structures of devices of the present invention will now be described.

A first structure has a mode thickness of around 1.2 $\mu$m. Its sequence of layers is as follows:
(layer 16: n=3.17) (layer 30: n=3.45, e=110 nm, $\lambda g$=1 420 nm) (layer 32: n=3.17, e=300 nm) (layer 34: n=3.45, e=50 nm, $\lambda g$=1 420 nm), this sequence being symmetrical, i.e. the layers 36, 38 and 20 have the same value as those given for layers 32, 30 and 16, respectively.

A second structure has a mode thickness of around 1.7 $\mu$m. Its sequence is also symmetrical and is as follows:
(layer 16: n=3.17) (layer 30: n=3.29, e=170 nm, $\lambda g$=1 110 nm) (layer 32: n=3.17, e=400 nm) (layer 34: n=3.29, e=120 nm, $\lambda g$=1 110 nm).

The dilution ratio is around 2.7 for both these structures.

A third structure of the present invention has been implemented on a n+ or semi-insulative substrate. It comprises, from the bottom towards the top: an InP buffer (layer 16) 1 $\mu$m thick which is n doped ($\sim 10^{17}$ cm$^{-3}$), a 0.15 $\mu$m thick GaInAsP layer 30 which is n doped ($\sim 10^{17}$ cm$^{-3}$), a 0.3 $\mu$m thick InP layer 32 which is n doped ($\sim 10^{17}$ cm$^{-3}$) or not intentionally doped, a 0.1 $\mu$m thick GaInAsP layer 34 which is n doped ($\sim 10^{17}$ cm$^{-3}$), a 0.3 $\mu$m thick InP layer 36 which is not intentionally doped, a 0.15 $\mu$m thick GaInAsP layer 38 which is n doped ($\sim 10^{17}$ cm$^{-3}$) or not doped, a 0.8 $\mu$m thick InP layer 20, 22 which is not intentionally doped in order to prevent absorption due to p doped layers, a 0.7 $\mu$m thick InP layer 24 which is progressively p doped ($\sim 5.10^{17}$ cm$^{-3}$ to $2.10^{18}$ cm$^{-3}$), and a 0.1 $\mu$m thick GaInAsP layer which is p+ doped ($\sim$several times $10^{19}$ cm$^{-3}$) to achieve good ohmic contact on deposition of the electrodes required to fabricate the active structures. The composition of the quaternary material is chosen to correspond to the 1.25 μm wavelength and for lattice compatibility with InP.

The strip 22 associated with this third structure had a constant width of 4 μm, both in the coupling segments and in the active segments. The internal losses of this structure were less than 1 dB/cm and the coupling losses were less than 1 dB per surface using lensed optical fibers with a radius of curvature of 10 μm.

There is claimed:

1. An electrically controllable strip-semiconductor active optical device comprising:
   a vertical succession of semiconductive layers forming a longitudinal guide structure for guiding a light undergoing a controlled processing in said device,
   said guide structure comprising a strip-shaped core structure, disposed between a bottom and a top confinement layer of said device, thereby imposing a single propagation mode defining a spatial distribution of power fractions of said light as guided by said guide structure,
   said core structure comprising a succession of high index layers, having a higher refractive index than said bottom and top confinement layers, and being mutually separated by a dilutant material having a lower refractive index than said high index layers, said high index layers having compositions enabling them to perform said controlled processing in response to a controlled density of charge carriers therein,
   said bottom and top confinement layers having thicknesses and dopant concentrations of respectively a first and a second mutually opposite types of conductivity for exchanging said charge carriers with said high index layers so as to control said charge carrier density in response to an electrical control signal applied to said core structure between said bottom and top confinement layers,
   said vertical succession of semiconductive layers further including a control layer, located on said top confinement layer, and having a dopant concentration of said second type of conductivity higher than said confinement layers, so that said control layer has an increased electrical conductivity and subjects a power fraction of said light therein to a parasitic absorption; and
   means for applying said control signal to said core structure from said control layer, whereby the greater said thickness of said top confinement layer the lower an efficiency of said control signal,
   wherein said succession of high index layers includes at least three said high index layers having thicknesses greater than that of quantum wells so that said efficiency of said control signal is kept high, while said power fraction of said light subjected to said parasitic absorption in said control layer is kept low.

2. Device according to claim 1 wherein a global structure including all the semiconductor layers of said wafer has a constant sequence of layers within said active segment and as far as said coupling surface.

3. Device according to claim 2 wherein said wafer further has along its length first and second coupling segments extending between said active segment and first and second coupling surfaces, respectively, at least one of said electrodes being formed only in said active segment.

4. Device according to claim 3 wherein the width of said strip decreases progressively in at least one coupling segment from said active segment as far as said coupling surface to increase the thickness of said guided mode at this surface.

5. Device according to claim 2 wherein said layer delimited at least partially in the transverse direction is said top confinement layer, said control layer and said top electrode being present only in the area of said strip to constitute an etched strip guide structure.

6. A strip semiconductor active optical device comprising an optical guide structure that includes a core structure, extending as far as a coupling surface of the device, and at least three high index layers having refractive indices increased relative to that of surrounding media in order to increase in said layers a power density of light to undergo processing in the device, said high index layers having compositions enabling said layers to perform said processing in response to electrical excitation, and having thicknesses greater than that of quantum wells, said surrounding media comprising dilutant layers having a lower refractive index and greater thicknesses than said high index layers, said high index layers being separated by said dilutant layers so that a single mode of propagation of said light is guided by said guide structure and has a thickness suited to coupling the light to an external optical component from said coupling surface, with the majority of the power of said light confined within the thickness of said core structure to favor said processing;
   said device further comprising a semiconductor wafer defining mutually perpendicular longitudinal, transverse and vertical directions and horizontal planes perpendicular to said vertical direction, lengths widths and thicknesses being defined in said longitudinal, transverse and vertical direction, respectively,
   said wafer having horizontal top and bottom surfaces extending in the longitudinal direction between two end surfaces, at least one of said end surfaces constituting a coupling surface which an optical component external to the device must face in order to achieve coupling, between said external component and the device, of light to be processed by the device,
   said wafer comprising horizontal layers having a continuous crystal structure and given thicknesses in succession in the vertical direction to constitute structures each including one layer or a plurality of adjacent layers, the compositions, the thicknesses and the order of succession of the layers of each structure constituting a sequence of layers of said structure,
   said wafer further comprising in succession from said bottom surface:
   a base structure having a first type of conductivity, at least an upper part of said structure being constituted by a bottom confinement layer transparent to the light to be processed by the device;
   a core structure transparent to the light to be processed by the device and including a high index layer having a refractive index increased relative to that of the surrounding materials, said high index layer having a thickness greater than that of a quantum well and a composition conferring upon it an energy gap whereby it interacts with the light to be processed by the device, this interaction being conditioned by a charge carrier density within said high index layer which is therefore an active layer:

a top confinement layer transparent to the light to be processed by the device, said top confinement layer being formed on the core structure and constituting with said bottom confinement layer and said core structure a guide structure, at least one layer of said guide structure being delimited in the transverse direction over at least part of its thickness to form a strip, said strip having a given width and extending in the longitudinal direction, so that the light to be processed by the device is guided monomodally by the guide structure in this longitudinal direction in a single guided mode having a width related to that of said strip, said mode also having a given thickness, the value of said charge carrier density within the width of said strip controlling interaction of said high index layer with the light of this guided mode so that this value constitutes a control density; and a control layer formed on the top confinement layer at least in an active segment occupying at least part of the length of said wafer, this control layer having a second type of conductivity opposite to the first type with an increased dopant concentration given it a high electrical conductivity to enable it to modify said control density by means of an electrical control signal applied between the base structure and this control layer, this increased dopant concentration causing this control layer to absorb the light to be processed by the device, wherein the top confinement layer has a limited thickness so that the control signal can modify effectively the control density, the top confinement layer having a thickness sufficiently large relative to that of said guided mode to limit absorption of light in this mode in the control layer;

said device further comprising bottom and top electrodes respectively formed on said bottom and top surfaces in said active segment to apply said control signal between said base structure and said control layer, wherein the core structure includes at least, in vertical succession from said bottom confinement layer to said top confinement layer;

a high index layer constituting a bottom high index layer;

a bottom dilutant layer having a lower refractive index than said bottom high index layer;

a high index layer constituting a median high index layer;

a top dilutant layer having a lower refractive index than said bottom and median high index layers; and a high index layer constituting a top high index layer, the sequence of layers of the guide structure being such that said single guided mode constitutes a thick mode having a thickness suited to coupling to an external optical component said guide structure extending longitudinally without any change in its sequence of layers within said active segment and as far as said coupling surface;

wherein the sequence of layers of the guide structure gives this structure a confinement ratio exceeding 70%, the confinement ratio being the ratio of the power of said guided mode within the thickness of said core structure, to the total power of said mode.

7. A strip semiconductor active optical device comprising an optical guide structure: that includes a core structure, extending as far as a coupling surface of the device, and at least three high index layers having refractive indices increased relative to that of surrounding media in order to increase in said layers a power density of light to undergo processing in the device, said high index layers having compositions enabling said layers to perform said processing in response to electrical excitation, and having thicknesses greater than that of quantum wells, said surrounding media comprising dilutant layers having a lower refractive index and greater thicknesses than said high index layers, said high index layers being separated by said dilutant layers so that a single mode of propagation of said light is guided by said guide structure and has a thickness suited to coupling the light to an external optical component from said coupling surface, with the majority of the power of said light confined within the thickness of said core structure to favor said processing;

said device further comprising a semiconductor wafer defining mutually perpendicular longitudinal, transverse and vertical directions and horizontal planes perpendicular to said vertical direction, lengths, widths and thicknesses being defined in said longitudinal, transverse and vertical direction, respectively, said wafer having horizontal top and bottom surfaces extending in the longitudinal direction between two end surfaces, at least one of said end surfaces constituting a coupling surface which an optical component external to the device must face in order to achieve coupling, between said external component and the device, of light to be processed by the device, said wafer comprising horizontal layers having a continuous crystal structure and given thicknesses in succession in the vertical direction to constitute structures each including one layer or a plurality of adjacent layers, the compositions, the thicknesses and the order of succession of the layers of each structure constituting a sequence of layers of said structure, said wafer further comprising in succession from said bottom surface:

a base structure having a first type of conductivity, at least an upper part of said structure being constituted by a bottom confinement layer transparent to the light to be processed by the device;

a core structure transparent to the light to be processed by the device and including a high index layer having a refractive index increased relative to that of the surrounding materials, said high index layer having a thickness greater than that of a quantum well and a composition conferring upon it an energy gap whereby it interacts with the light to be processed by the device, this interaction being conditioned by a charge carrier density within said high index layer which is therefore an active layer;

a top confinement layer transparent to the light to be processed by the device, said top confinement layer being formed on the core structure and constituting with said bottom confinement layer and said core structure a guide structure, at least one layer of said guide structure being delimited in the transverse direction over at least part of its thickness to form a strip, said strip having a given width and extending in the longitudinal direction, so that the light to be processed by the device is guided monomodally by the guide structure in this longitudinal direction in a single guided mode having a width related to that of said strip, said mode also having a given thickness, the value of said charge carrier density within the width of said strip controlling interaction of said high index layer with the light of this guided mode so that this value constitutes a control density; and a control layer formed on the top confinement layer at least in an active segment occupying at least part of the length of said wafer, this control layer having a second type of conductivity opposite to the first type with an increased dopant concentration given it a high electrical conductivity to enable it to modify said control density by means of an electrical control signal applied between the base structure and this control layer, this increased dopant concentration causing this control layer to absorb the light to be processed by the device, wherein the top confinement layer has a limited thickness so that the control signal can modify effectively the control density, the top confinement layer having a thickness sufficiently large relative to that of said guided mode to limit absorption of light in this mode in the control layer;

said device further comprising bottom and top electrodes respectively formed on said bottom and top surfaces in said active segment to apply said control signal between said base structure and said control layer, wherein the core structure includes at least, in vertical succession from said bottom confinement layer to said top confinement layer;

a high index layer constituting a bottom high index layer;

a bottom dilutant layer having a lower refractive index than said bottom high index layer;

a high index layer constituting a median high index layer;

a top dilutant layer having a lower refractive index than said bottom and median high index layers; and a high index layer constituting a top high index layer, the sequence of layers of the guide structure being such that said single guided mode constitutes a thick mode having a thickness suited to coupling to an external optical component, said guide structure extending longitudinally without any change in its sequence of layers within said active segment and as far as said coupling surface;

wherein the sequence of layers of the guide structure confers a thickness of between 1 $\mu$m and 2 $\mu$m on said guided mode.

8. Device according to claim 7 wherein said high index layers and said dilutant and confinement layers have a difference in refractive index greater than 0.15 and individual thicknesses greater than 30 nm so as to concentrate the light in these layers to favor said interaction, the individual thicknesses of these high index layers being less than 300 nm so that said guided mode is a single mode, a dilution ratio being defined by the ratio of the total thickness of the core structure to the total thickness of the high index layers only, this dilution ratio being greater than 2 to confer said thickness on the guided mode.

* * * * *